Patented Feb. 13, 1940

2,190,587

UNITED STATES PATENT OFFICE 2,190,587

SOFTENING RUBBER

Ira Williams, Woodstown, and Carroll Cummings Smith, Carneys Point, N. J., assignors to E. I. du Pont de Nemours & Company, Wilmington, Del., a corporation of Delaware No Drawing. Application December 31, 1937, Serial No. 182,812

22 Claims. (Cl. 260—761)

This invention relates to rubber and more particularly to methods of treating rubber to produce a more plastic product.

It is known that rubber may be plasticized if milled in the presence of oxygen. It is also known that rubber may be more rapidly plasticized during the milling if a thio-phenol is present. These thio-phenols are active at temperatures as low as 70° C., but have certain objectionable properties.

An object of the present invention is to provide a new class of materials which are efficient plasticizing agents and which are, in general, less objectionable to use than previously proposed compounds for this purpose. Another object is to provide a method for plasticizing rubber. A further object is to provide rubber of increased plasticity. Further objects are to provide new compositions of matter and to advance the art. Still other objects will appear hereinafter.

These objects may be accomplished in accordance with our invention, which comprises subjecting the unvulcanized rubber, at temperatures of about 120° C. or more, to the action of a mercapto arylene thiazole containing only one thiazole ring as a part of any one aromatic ring, and derivatives of such thiazoles which liberate the free thiazoles under the conditions employed. Such thiazoles must be employed in the absence of any substantial amount of sulfur, in the absence of more than 5% of a pigment and in the absence of sufficient neutralizing material to neutralize the thiazole under the conditions employed. The rubber must be heated with the thiazole for a sufficient length of time for said thiazole to effect a marked decrease in the resistance of the rubber to flow over that which the rubber would have if subjected to the same conditions in the absence of said thiazole compound.

Many mercapto arylene thiazoles and their derivatives have been employed and proposed for use as accelerators for the vulcanization of rubber. Such thiazoles have generally been employed in the presence of a substantial amount of sulfur whereby vulcanization of the rubber takes place without any plasticizing action. Also, other ingredients have usually been present which would prevent any plasticizing action. Further, such thiazoles have been added to rubber in the absence of sulfur and sometimes in the absence of other added ingredients to form what is known as a master batch. However, the practice employed in the preparation of master batches has involved the use of low temperatures, and there has been no attempt made to increase the temperature of the mixtures to temperatures which would produce a plasticizing action. In general, a positive attempt is made to maintain the temperatures as low as possible in preparing such master batches. We have found that the mercapto thiazoles, which are effective for accelerating the vulcanization of rubber, are effective for plasticizing unvulcanized rubber when employed in accordance with our invention.

By the phrase "containing only one thiazole ring as a part of any one aromatic ring", we intend to include compounds containing two or more thiazole rings on different aromatic rings. However, no one aromatic ring may contain more than one thiazole ring and we intend to exclude compounds containing two or more thiazole rings on a single aromatic ring. By the term "derivatives of such thiazoles which liberate the free thiazoles under the conditions employed", we intend to include the derivatives of the thiazoles which decompose at temperatures of 120° C. or above to liberate the free thiazole in the rubber, and also salts and other derivatives which are decomposed by the acids naturally present in the rubber or which have been added to the rubber in sufficient amount to release the free thiazole. In other words, it is the free mercapto thiazole which is the effective agent for our purpose. Accordingly, our compounds must be employed in the absence of a sufficient amount of a neutralizing material to neutralize the thiazole under the conditions employed. It is well known that some materials which will neutralize the thiazoles in aqueous solution, will not neutralize the thiazoles in rubber, particularly at temperatures of 120° C. or more. Such materials may be present. There are also other neutralizing materials such as ammonia which would neutralize the thiazole in rubber, but which are sufficiently volatile at temperatures of 120° C. and more, so that they would be expelled from the rubber, and any salts thereof would be decomposed, so that they would not be effective to neutralize the thiazole under the conditions employed. Such materials may also be present.

The presence of sulfur is harmful, tending to inhibit the plasticizing action of our agents. Accordingly, when our agents are employed as plasticizers for rubber, they must be employed in the absence of more than 0.5% of sulfur based on the rubber. When we employ the terms "substantial amount of sulfur" or "substantial amount of added compounding ingredient", we mean an amount in excess of 0.5% based on the rubber.

Pigments such as carbon black and the like, when present in large amounts, also exert a retarding effect on the action of our compounds. Accordingly, our compounds must be employed in the absence of more than 5% of such a pigment, and preferably in the absence of any substantial amount (0.5%) of such pigment.

In general, the arylene group of our compounds may be any aromatic group of the benzene, naphthalene, anthracene, phenanthrene or higher series, but is preferably of the benzene or naphthalene series. Such aromatic groups may contain as substituents alkyl, aryl, alkoxy, aryloxy, hydroxy, halogen, nitro, sulfonic, amino and other substituents. Preferably, however, the arylene radical will consist of the elements carbon and hydrogen; that is will be unsubstituted except for alkyl and aryl radicals. Basic substituents appear to decrease the activity of our compounds, and hence should be avoided.

Satisfactory mercapto arylene thiazoles may be prepared by any of the well known methods such as heating an aromatic amine with carbon disulfide and sulfur. In case a substituted amine such as m-toluidine is employed, the resulting product is usually a mixture of compounds in which the methyl group occupies different positions. If b-naphthylamine is used as the starting material, the sulfur of the thiazole grouping may be attached to either the 1 or the 3 position of the naphthalene ring. Such mixtures of products are entirely satisfactory.

The best plasticizing action is produced if the rubber is milled in the presence of from about 0.25% to about 2% of the mercapto arylene thiazole based on the rubber at temperatures of about 120° C. or above, and in the absence of compounding ingredients or effectively basic materials. Larger amounts of our agents may be employed if desired, but without substantial advantage. With the most active compounds of our invention, any temperature above 120° C. may be employed which is not sufficiently high to destroy the rubber, or the plasticizing agent. Usually, the temperature will be held below 200° C. Preferably, we employ temperatures of from about 130° C. to about 150° C.

In order to more clearly illustrate our invention and the preferred modes of carrying the same into effect, the following examples are given:

EXAMPLE 1

The effect of temperature on the plasticizing of rubber when 2-mercapto-benzo-thiazole is used as the catalyst is shown in the following experiment. 75 parts of smoked sheet rubber were placed in an internal mixer and treated with 0.75 part, or 1% of mercapto-benzo-thiazole. The milling was conducted at as nearly a uniform temperature as possible and the actual temperature of the rubber was determined by means of a thermocouple and potentiometer. Plasticizing of the treated rubber was determined by means of a pendulum plastometer. With this instrument, the smaller number represents the softest rubber. Variation in the steps of mixing and determination of plasticity were sufficiently well controlled that duplicate tests should check within about two points of plasticity and differences greater than this would begin to have significance. The results of milling at various temperatures in the presence of 2-mercapto-benzo-thiazole are shown in Table I.

TABLE I

*The effect of temperature on the plasticizing action of mercapto-benzo-thiazole*

| Temperature, °C. | Plasticity 1.0% mercapto-benzo-thiazole |
|---|---|
| 92 | 42.0 |
| 97.5 | 42.0 |
| 98 | 42.5 |
| 101 | 42.5 |
| 102 | 44.0 |
| 104 | 44.0 |
| 107 | 44.0 |
| 107 | 43.5 |
| 108 | 43.5 |
| 118 | 42.5 |
| 124 | 39.5 |
| 126 | 38.5 |
| 136 | 37.0 |
| 140 | 34.0 |
| 142 | 33.5 |

EXAMPLE 2

Fifty parts of smoked sheet rubber were milled in an internal mixer at a temperature of about 130° C. for 10 minutes with 0.5% of various mercapto arylene thiazoles. The following results were obtained:

| Material | Plasticity |
|---|---|
| Control | 45 |
| Di-mercapto di-thiazole prepared from p-phenylene diamine | 45 |
| 2-mercapto 5-methyl 6-amino benzo thiazole | 40 |
| 2-mercapto a-naphtho thiazole | 26 |
| Zinc salt of 2-mercapto benzo thiazole | 34 |
| 2-mercapto 6-chlor benzo thiazole | 30 |
| 2-benzo thiazyl benzoyl sulfide | 36 |
| 2-6-di-mercapto benzo thiazole | 38 |

The di-mercapto di-thiazole prepared from p-phenylene-diamine is illustrative of a compound containing two thiazole rings as part of a single aromatic ring. The zinc salt of 2-mercapto benzo thiazole and the 2-benzo-thiazyl benzoyl sulfide liberated the free thiazole in the rubber under the conditions employed, the rubber containing free acids naturally present.

The retarding effect of sulfur on the development of plasticity by our compounds is shown in the following Example 3:

EXAMPLE 3

Fifty parts of rubber were masticated for 10 minutes in an internal mixer at a temperature of 130° C. In one test the rubber was treated with 0.5% of 2-mercapto benzo thiazole. A second test included 0.5% of mercapto benzo thiazole and 2.0% of sulfur, while a third test included no added ingredient. The plasticity of each rubber mix was determined with the pendulum plastometer.

| Material added | Plasticity |
|---|---|
| Mercapto benzo thiazole | 34 |
| Mercapto benzo thiazole+sulfur | 45 |
| None | 45 |

The inhibiting action of compounding ingredients such as whiting, carbon black and zinc oxide is shown in the following Examples 4, 5 and 6:

EXAMPLE 4

Fifty parts of smoked sheet rubber were milled for two minutes in an internal mixer. 5 parts of whiting and 5 parts of zinc oxide and 0.25 part of 2-mercapto benzo thiazole were then added and the milling was continued for an additional 18 minutes. A second stock was run from which the mercapto benzo thiazole was omitted. The milling temperatures and plasticities are shown in the following table. No softening is indicated.

| Softening material | Final temperature of rubber | Plasticity |
|---|---|---|
| | °C. | |
| None | 137 | 61 |
| Mercapto benzo thiazole | 139 | 60 |

EXAMPLE 5

A master batch composed of rubber, 100 parts; Quaker whiting, 25 parts; and zinc oxide, 5 parts, was mixed on a steam heated mill. 65 gram portions of this master batch were then milled in an internal mixer at 135° C. for six minutes, both in the absence of any added ingredient and in the presence of 0.25 gram of 2-mercapto benzo thiazole. The following results were obtained:

| Stock | Plasticity |
|---|---|
| Master batch, not milled in internal mixer | 57.5 |
| Master batch, milled without additional material | 56.5 |
| Master batch with mercapto benzo thiazole | 57.0 |

EXAMPLE 6

A master batch containing rubber, 100 parts; carbon black, 40 parts; and zinc oxide, 5 parts, was mixed on a steam heated mill. 72.5 gram portions were then mixed for 6 minutes at 130° C. in an internal mixer with 0.25 gram of 2-mercapto benzo thiazole. A control mix was made from which the mercapto benzo thiazole was omitted. The following results show no softening caused by the added ingredient.

| Stock | Plasticity |
|---|---|
| Master batch, not milled in internal mixer | 73.0 |
| Master batch without additional material | 66.5 |
| Master batch with mercapto benzo thiazole | 65.5 |

While we have disclosed the preferred embodiments of our invention, it will be readily apparent that many other compounds within the scope of our invention may be employed. Generally derivatives of the mercapto arylene thiazoles in which the hydrogen of the mercaptan is replaced by an element or a group from which the mercaptan may be readily regenerated by hydrolysis are effective.

While we have disclosed the use of our compounds in solid unvulcanized rubber, they may also be employed in latex, rubber solutions or cements which can withstand the temperatures employed. Closed reaction vessels will be used where necessary to avoid loss of volatile solvent and the like.

While we have disclosed the preferred embodiments of our invention and the preferred modes of carrying the same into effect, it will be readily apparent to those skilled in the art that many variations and modifications may be made in the compounds employed, methods of treating and other conditions without departing from the spirit of our invention. Accordingly, the scope of our invention is to be limited solely by the appended claims construed as broadly as is permissible in view of the prior art.

We claim:
1. The method of decreasing the resistance to flow of unvulcanized rubber which comprises subjecting the unvulcanized rubber at temperatures of from about 130° C. to about 200° C. to the action of at least 0.25% of a thiazole compound of the group consisting of mercapto arylene thiazoles containing only one thiazole ring as a part of any one aromatic ring and derivatives of such thiazoles which liberate the free thiazoles under the conditions employed, in the absence of more than 0.5% of sulfur, in the absence of more than 5% of a pigment, in the absence of sufficient neutralizing material to neutralize the thiazole under the conditions employed, for a sufficient length of time for said thiazole compound to effect a marked decrease in the resistance of the rubber to flow over that which the rubber would have if subjected to the same conditions in the absence of said thiazole compound.

2. The method of decreasing the resistance to flow of unvulcanized rubber which comprises subjecting the unvulcanized rubber at temperatures of from about 130° C. to about 200° C. to the action of at least 0.25% of a mercapto arylene thiazole containing only one thiazole ring, in the absence of more than 0.5% of sulfur, in the absence of more than 5% of a pigment, in the absence of sufficient neutralizing material to neutralize the thiazole under the conditions employed, for a sufficient length of time for said thiazole to effect a marked decrease in the resistance of the rubber to flow over that which the rubber would have if subjected to the same conditions in the absence of said thiazole.

3. The method of decreasing the resistance to flow of unvulcanized rubber which comprises subjecting the unvulcanized rubber at temperatures of from about 130° C. to about 200° C. to the action of at least 0.25% of a mercapto benzo thiazole containing only one thiazole ring, in the absence of more than 0.5% of sulfur, in the absence of more than 5% of a pigment, in the absence of sufficient neutralizing material to neutralize the thiazole under the conditions employed, for a sufficient length of time for said thiazole to effect a marked decrease in the resistance of the rubber to flow over that which the rubber would have if subjected to the same conditions in the absence of said thiazole.

4. The method of decreasing the resistance to flow of unvulcanized rubber which comprises subjecting the unvulcanized rubber at temperatures of from about 130° C. to about 150° C. to the action of 0.25% to about 2% of a mercapto benzo thiazole containing only one thiazole ring and in which the benzo radical consists of carbon and hydrogen, in the absence of more than 0.5% of sulfur, in the absence of more than 5% of a pigment, in the absence of sufficient neutralizing material to neutralize the thiazole under the conditions employed, for a sufficient length of time for said thiazole to effect a marked decrease in the resistance of the rubber to flow over that which the rubber would have if subjected to the same conditions in the absence of said thiazole.

5. The method of decreasing the resistance to flow of unvulcanized rubber which comprises subjecting the unvulcanized rubber at temperatures of from about 130° C. to about 150° C. to the action of 0.25% to about 2% of 2-mercapto benzo thiazole, in the absence of more than 0.5% of sulfur, in the absence of more than 5% of a pigment, in the absence of sufficient neutralizing material to neutralize the thiazole under the conditions employed, for a sufficient length of time for said thiazole to effect a marked decrease in the resistance of the rubber to flow over that which the rubber would have if subjected to the same conditions in the absence of said thiazole.

6. The method of decreasing the resistance to flow of unvulcanized rubber which comprises subjecting the unvulcanized rubber at temperatures of from about 130° C. to about 200° C. to the action of at least 0.25% of a mercapto naphtho thiazole containing only one thiazole ring, in the absence of more than 0.5% of sulfur, in the absence of more than 5% of a pigment, in the absence of sufficient neutralizing material to neutralize the thiazole under the conditions employed, for a sufficient length of time for said thiazole to effect a marked decrease in the resistance of the rubber to flow over that which the rubber would have if subjected to the same conditions in the absence of said thiazole.

7. The method of decreasing the resistance to flow of unvulcanized rubber which comprises subjecting the unvulcanized rubber at temperatures of from about 130° C. to about 150° C. to the action of 0.25% to about 2% of a mercapto naphtho thiazole containing only one thiazole ring and in which the naphtho radical consists of carbon and hydrogen, in the absence of more than 0.5% of sulfur, in the absence of more than 5% of a pigment, in the absence of sufficient neutralizing material to neutralize the thiazole under the conditions employed, for a sufficient length of time for said thiazole to effect a marked decrease in the resistance of the rubber to flow over that which the rubber would have if subjected to the same conditions in the absence of said thiazole.

8. The method of decreasing the resistance to flow of unvulcanized rubber which comprises subjecting the unvulcanized rubber at temperatures of from about 130° C. to about 150° C. to the action of 0.25% to about 2% of 2-mercapto a-naphtho thiazole, in the absence of more than 0.5% of sulphur, in the absence of more than 5% of a pigment, in the absence of sufficient neutralizing material to neutralize the thiazole under the conditions employed, for a sufficient length of time for said thiazole to effect a marked decrease in the resistance of the rubber to flow over that which the rubber would have if subjected to the same conditions in the absence of said thiazole.

9. The method of decreasing the resistance to flow of unvulcanized rubber which comprises subjecting the unvulcanized rubber at temperatures of from about 130° C. to about 200° C. to the action of at least 0.25% of a thiazole compound of the group consisting of mercapto arylene thiazoles containing only one thiazole ring as a part of any one aromatic ring and derivatives of such thiazoles which liberate the free thiazoles under the conditions employed, in the absence of added compounding ingredient, for a sufficient length of time for said thiazole compound to effect a marked decrease in the resistance of the rubber to flow over that which the rubber would have if subjected to the same conditions in the absence of said thiazole compound.

10. The method of decreasing the resistance to flow of unvulcanized rubber which comprises subjecting the unvulcanized rubber at temperatures of from about 130° C. to about 200° C. to the action of at least 0.25% of a mercapto arylene thiazole containing only one thiazole ring and in which the arylene radical is a member of the group consisting of the benzene and naphthalene series, in the absence of added compounding ingredient, for a sufficient length of time for said thiazole to effect a marked decrease in the resistance of the rubber to flow over that which the rubber would have if subjected to the same conditions in the absence of said thiazole.

11. The method of decreasing the resistance to flow of unvulcanized rubber which comprises subjecting the unvulcanized rubber at temperatures of from about 130° C. to about 150° C. to the action of about 0.25% to about 2% of a mercapto benzo thiazole containing only one thiazole ring, in the absence of added compounding ingredient, for a sufficient length of time for said thiazole to effect a marked decrease in the resistance of the rubber to flow over that which the rubber would have if subjected to the same conditions in the absence of said thiazole.

12. The method of decreasing the resistance to flow of unvulcanized rubber which comprises subjecting the unvulcanized rubber at temperatures of from about 130° C. to about 200° C. to the action of at least 0.25% of a mercapto naphtho thiazole containing only one thiazole ring, in the absence of added compounding ingredient, for a sufficient length of time for said thiazole to effect a marked decrease in the resistance of the rubber to flow over that which the rubber would have if subjected to the same conditions in the absence of said thiazole.

13. Unvulcanized rubber of decreased resistance to flow obtained by subjecting the unvulcanized rubber at temperatures of from about 130° C. to about 200° C. to the action of at least 0.25% of a thiazole compound of the group consisting of mercapto arylene thiazoles containing only one thiazole ring as a part of any one aromatic ring and derivatives of such thiazoles which liberate the free thiazoles under the conditions employed, in the absence of more than 0.5% of sulphur, in the absence of more than 5% of a pigment, in the absence of sufficient neutralizing material to neutralize the thiazole under the conditions employed, for a sufficient length of time for said thiazole compound to effect a marked decrease in the resistance of the rubber to flow over that which the rubber would have if subjected to the same conditions in the absence of said thiazole compound.

14. Unvulcanized rubber of decreased resistance to flow obtained by subjecting the unvulcanized rubber at temperatures of from about 130° C. to about 200° C. to the action of at least 0.25% of a mercapto arylene thiazole containing only one thiazole ring, in the absence of more than 0.5% of sulfur, in the absence of more than 5% of a pigment, in the absence of sufficient neutralizing material to neutralize the thiazole under the conditions employed, for a sufficient length of time for said thiazole to effect a marked decrease in the resistance of the rubber to flow over that which the rubber would have if subjected to the same conditions in the absence of said thiazole.

15. Unvulcanized rubber of decreased resistance to flow obtained by subjecting the unvulcanized rubber at temperatures of from about 130° C. to about 200° C. to the action of at least 0.25% of a thiazole compound of the group consisting of mercapto arylene thiazoles containing only one thiazole ring as a part of any one aromatic ring and derivatives of such thiazoles which liberate the free thiazoles under the conditions employed, in the absence of added compounding ingredient, for a sufficient length of time for said thiazole compound to effect a marked decrease in the resistance of the rubber to flow over that which the rubber would have if subjected to the same conditions in the absence of said thiazole.

16. Unvulcanized rubber of decreased resistance to flow obtained by subjecting the unvulcanized rubber at temperatures of from about 130° C. to about 150° C. to the action of 0.25% to about 2% of a mercapto benzo thiazole containing only one thiazole ring and in which the benzo radical consists of carbon and hydrogen, in the absence of more than 0.5% of sulfur, in the absence of more than 5% of a pigment, in the absence of sufficient neutralizing material to neutralize the thiazole under the conditions employed, for a sufficient length of time for said thiazole to effect a marked decrease in the resistance of the rubber to flow over that which the rubber would have if subjected to the same conditions in the absence of said thiazole.

17. Unvulcanized rubber of decreased resistance to flow obtained by subjecting the unvulcanized rubber at temperatures of from about 130° C. to about 150° C. to the action of 0.25% to about 2% of 2-mercapto benzo thiazole, in the absence of more than 0.5% of sulfur, in the absence of more than 5% of a pigment, in the absence of sufficient neutralizing material to neutralize the thiazole under the conditions employed, for a sufficient length of time for said thiazole to effect a marked decrease in the resistance of the rubber to flow over that which the rubber would have if subjected to the same conditions in the absence of said thiazole.

18. Unvulcanized rubber of decreased resistance to flow obtained by subjecting the unvulcanized rubber at temperatures of from about 130° C. to about 200° C. to the action of at least 0.25% of a mercapto naphtho thiazole containing only one thiazole ring, in the absence of more than 0.5% of sulfur, in the absence of more than 5% of a pigment, in the absence of sufficient neutralizing material to neutralize the thiazole under the conditions employed, for a sufficient length of time for said thiazole to effect a marked decrease in the resistance of the rubber to flow over that which the rubber would have if subjected to the same conditions in the absence of said thiazole.

19. Unvulcanized rubber of decreased resistance to flow obtained by subjecting the unvulcanized rubber at temperatures of from about 130° C. to about 150° C. to the action of 0.25% to about 2% of 2-mercapto a-naphtho thiazole, in the absence of more than 0.5% of sulfur, in the absence of more than 5% of a pigment, in the absence of sufficient neutralizing material to neutralize the thiazole under the conditions employed, for a sufficient length of time for said thiazole to effect a marked decrease in the resistance of the rubber to flow over that which the rubber would have if subjected to the same conditions in the absence of said thiazole.

20. Unvulcanized rubber of decreased resistance to flow obtained by subjecting the unvulcanized rubber at temperatures of from about 130° C. to about 150° C. to the action of at least 0.25% of a mercapto arylene thiazole containing only one thiazole ring and in which the arylene radical consists of carbon and hydrogen, in the absence of added compounding ingredient, for a sufficient length of time for said thiazole to effect a marked decrease in the resistance of the rubber to flow over that which the rubber would have if subjected to the same conditions in the absence of said thiazole.

21. Unvulcanized rubber of decreased resistance to flow obtained by subjecting the unvulcanized rubber at temperatures of from about 130° C. to about 150° C. to the action of at least 0.25% of 2-mercapto benzo thiazole, in the absence of added compounding ingredient, for a sufficient length of time for said thiazole to effect a marked decrease in the resistance of the rubber to flow over that which the rubber would have if subjected to the same conditions in the absence of said thiazole.

22. Unvulcanized rubber of decreased resistance to flow obtained by subjecting the unvulcanized rubber at temperatures of from about 130° C. to about 150° C. to the action of at least 0.25% of 2-mercapto a-naphtho thiazole, in the absence of added compounding ingredient, for a sufficient length of time for said thiazole to effect a marked decrease in the resistance of the rubber to flow over that which the rubber would have if subjected to the same conditions in the absence of said thiazole.

IRA WILLIAMS.
CARROLL CUMMINGS SMITH.